United States Patent
Wyman

[11] Patent Number: 5,557,957
[45] Date of Patent: Sep. 24, 1996

[54] AUTOMATIC STEERING WHEEL ANTI-THEFT SYSTEM

[76] Inventor: Victor D. Wyman, 1314 Highway 30, Griffith, Ind. 46319

[21] Appl. No.: 441,402

[22] Filed: May 15, 1995

[51] Int. Cl.$^6$ ............................................... B60R 25/02
[52] U.S. Cl. ............................ 70/209; 180/287; 70/257; 70/237; 307/10.3
[58] Field of Search .................... 70/209, 211, 212, 70/225, 226, 237, 238, 256, 257; 180/287; 307/10.3, 10.6

[56] References Cited

U.S. PATENT DOCUMENTS

| | | | |
|---|---|---|---|
| 4,304,110 | 12/1981 | Fain | 70/09 |
| 4,332,306 | 6/1982 | Turatti | 307/10.3 |
| 4,700,801 | 10/1987 | Ailing | 307/10.3 |
| 4,982,810 | 1/1991 | Toy | 180/287 |
| 5,031,429 | 7/1991 | Wang | 70/209 |
| 5,042,278 | 8/1991 | Wang | 70/209 |
| 5,097,685 | 3/1992 | Lien | 70/238 |
| 5,128,649 | 7/1992 | Elmer | 70/237 |
| 5,165,264 | 11/1992 | Chen | 70/209 |
| 5,197,308 | 3/1993 | Pazik | 70/209 |
| 5,239,849 | 8/1993 | Gallardo | 70/209 |
| 5,289,706 | 3/1994 | Krebs et al. | 70/252 |
| 5,353,614 | 10/1994 | Anderson | 70/209 |
| 5,409,077 | 4/1995 | Ball | 70/238 |
| 5,412,963 | 5/1995 | Carlo et al. | 70/209 |
| 5,442,942 | 8/1995 | Geisler | 70/226 |

FOREIGN PATENT DOCUMENTS

| | | | |
|---|---|---|---|
| 2589929 | 5/1987 | France | 70/283 |
| 3105175 | 9/1982 | Germany | 70/237 |

*Primary Examiner*—Darnell M. Boucher
*Attorney, Agent, or Firm*—Richard G. Kinney

[57] ABSTRACT

A steering wheel anti-theft system for an automobile having an ignition key switch assembly and a steering wheel wherein a pair of extendable rods are built into the transverse body of the steering wheel for radial extension and retraction in between an extended position wherein they are visible and interfere with the driving of the automobile and a storage position wherein they are retracted in the steering wheel and do not so interfere. The steering column ignition key assembly includes an electric switch which is opened and closed by the turning of a key for connecting or not connecting a source of electrical power to electronically operated latches for securing said rods in extended positions when said switch is opened or allowing it to be retracted only when said switch is closed. The disclosed latches are solenoids in the steering wheel that retract a spring loaded pin when electrically energized but when unenergizied allow the pin to be driven into a hole in the extended rod to latch it in that position. Only by operating the ignition key switch can the rods be unlatched and manually retracted and only that one key switch need be operated to unlatch the anti-theft system and start and run the automobile.

9 Claims, 2 Drawing Sheets

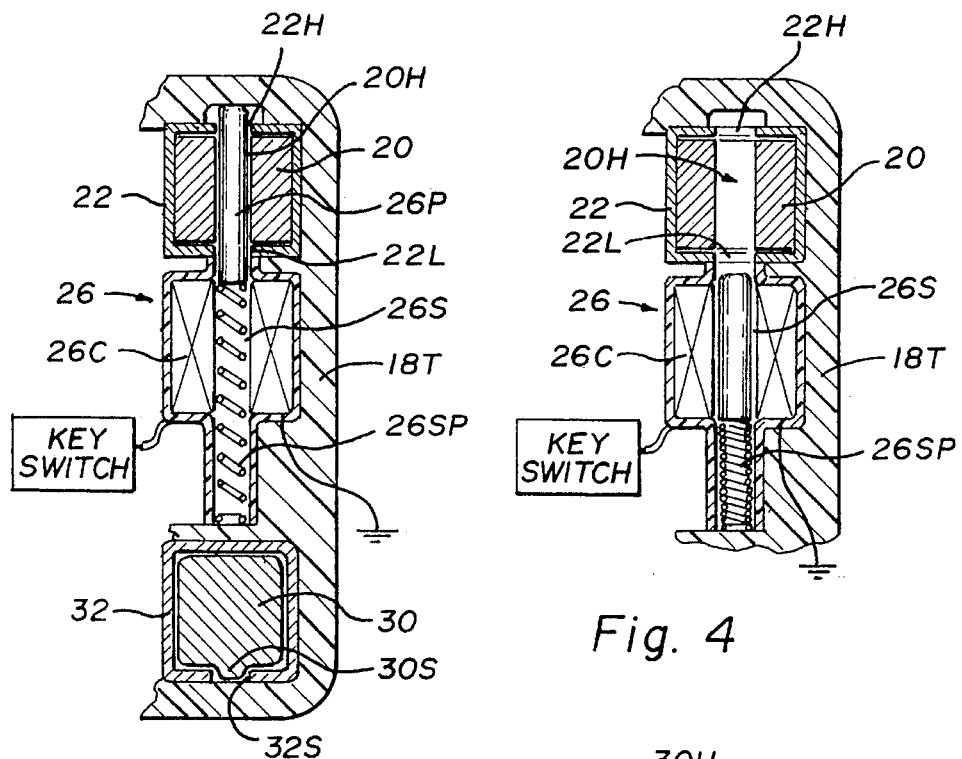
Fig. 3
Fig. 4
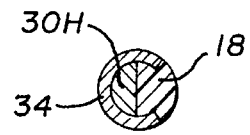
Fig. 6
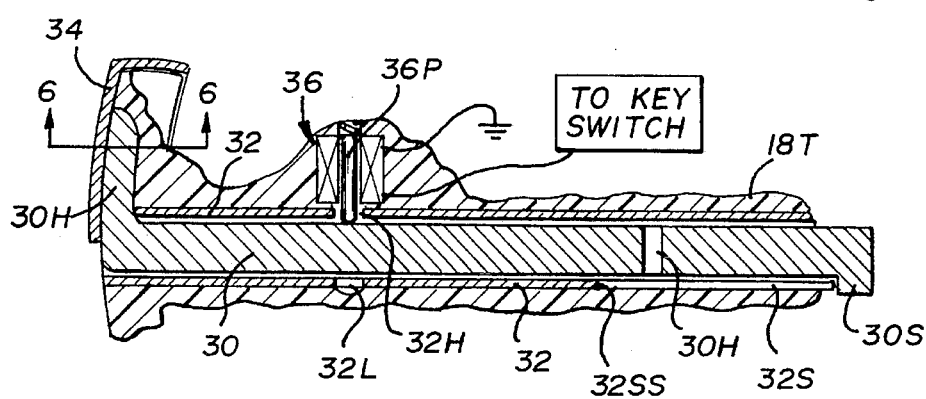
Fig. 5

AUTOMATIC STEERING WHEEL ANTI-THEFT SYSTEM

FIELD OF THE INVENTION

This invention is concerned with a new and improved steering wheel anti-theft system.

BACKGROUND OF THE INVENTION

The problem of the frequent theft of automobiles has led to the requirement of steering wheel locks as part of the ignition key assembly on cars sold in the U.S.A. See U.S. Pat. No. 5,289,706 and patents cited in it for a description of such ignition steering wheel locks. These systems are, apparently, sufficiently easy to break or defeat that a number of commercial add-on locks have been offered in the marketplace and suggested. These include add-on devices that are locked onto the steering wheel and provide an extension rod or arm that makes driving the vehicle difficult or impossible until the device is removed. Examples of this type of add-on device are shown and described in U.S. Pat. Nos. 5,353,614; 5,239,849; 5,197,308; 5,042,278; 4,304,110; and 5,165,264.

Lockable extension arms or bars that are built into the steering wheel are depicted in U.S. Pat. No. 5,031,429 which also depicts prior art devices that lock the wheel to a floor pedal. U.S. Pat. 4,982,810 depicts a built-in steering wheel locking device that selectively extends from the vehicle's dashboard to captivate the steering wheel.

While these prior devices (perhaps because of their visibility when used) may be effective in discouraging theft of a vehicle, they suffer from significant drawbacks in that they are not convenient to active or to remove. This tends to lessen their use and their effectiveness. There thus exists the need of a steering wheel lock system that is easy to use and disconnect and when used is visible to discourage thieves.

SUMMARY OF THE INVENTION

To overcome one or more of the disadvantages of the prior art, a steering wheel anti-theft system is provided for an automobile having a conventional ignition key assembly. The system includes at least one extendable rod built into the steering wheel and means allowing the rod to be moved and locked into an extended visible position when the ignition key assembly is turned off and the key removed but which is automatically unlocked when the ignition key is inserted and turned. The rod can then be moved to and left in a hidden position within the steering wheel and the vehicle driven in a conventional manner.

The automatic unlocking of the visible extension rods allows for the vehicle to be started and the rod retracted and the vehicle driven as quickly, or nearly as quickly, as it can be when the rod is not extended. Preferably, two radially extending rods, one on either side of the steering wheel, are provided, both unlocked simultaneously by the key assembly. These two rods are clearly visible when in use but are preferably entirely hidden when retracted.

The invention, together with further advantages and features thereof, may best be understood by reference to the following description, taken in connection with the accompanying drawings, in the several figures of which like reference numerals identify like elements.

BRIEF DESCRIPTION OF THE DRAWING

FIG. 3 is a sectional. view of a portion of the system of FIG. 1 as seen from the plane of the line designated 3—3 in FIG. 1 with a partial schematic depiction of the electric circuit.

FIG. 4 is a partial sectional view of the apparatus shown in FIG. 3 with parts shown in removed positions to illustrate the operation of the system.

FIG. 5 is a partial sectional view of a portion of the system of FIGS. 1–4.

FIG. 6 is a sectional view as seen from the plane of the line 6—6 of FIG. 5.

DETAILED DESCRIPTION OF THE PREFERRED EMBODIMENTS

Figure 1:
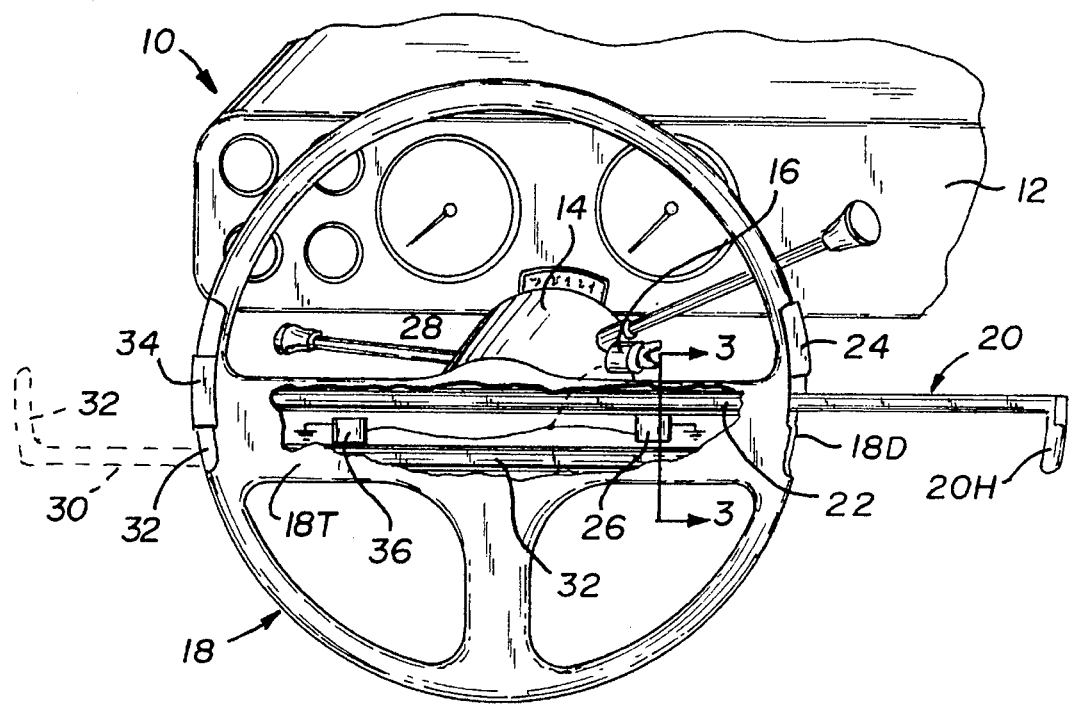
FIG. 1 is a perspective partial view of the interior of an automobile showing a steering wheel anti-theft system constructed in accordance with the principles of the present invention. A portion of the steering wheel is removed to show interior parts and one of two rods is depicted in its extended position and the extended position of the other rod is shown in dashed outline.

Referring to FIG. 1, there is depicted an automobile 10 having a dash 12, a steering column 14, a steering column key assembly 16 (including an electrical switch controlled by a key inserted therein) and a steering wheel 18. The wheel and key assembly are constructed in accordance with the principles of the present invention. The remaining components of the automobile 10 may be entirely conventional and therefore need not be described in detail herein.

In accordance with the present invention, the steering wheel 18 is provided with a built-in generally radially extendable rod 20 which is slidable in a sleeve 22 between an extended position shown in FIG. 1 and a retracted position when the rod 20 is entirely received in and hidden by the steering wheel 18 central transverse section 18T.

The rod 20 has a hook 20H at its outermost end, which hook 20H upon retraction of the rod 20 fits into a matching depression 18D of the steering wheel 18. A sleeve detent 24 can be manually slid downward to secure the rod 20 in its retracted position.

Also in accordance with the present invention, a second rod 30 is provided in the steering wheel 18. In FIG. 1, this rod 30 is shown in its retracted position in solid lines and is within the transverse sleeve 32 of the steering wheel 18. This rod 30 has a hook 32, similar to the hook 20H, which is also received in the wheel 18 and when retracted forms a part of the outer surface of the steering wheel 18 and may be secured or latched in the closed position by a sleeve 34.

Also in accordance with the present invention are provided means coupled to the ignition key assembly 16 for locking the rods 20 and 30 in their extended positions and for unlocking them in response to the insertion and turning of an ignition key in ignition key assembly 16. This means includes a pair of solenoids 26, 36 which have coils that are grounded to the chassis on one side and connected via line 28 on the other side to the key switch of key assembly 16.

Figure 2:
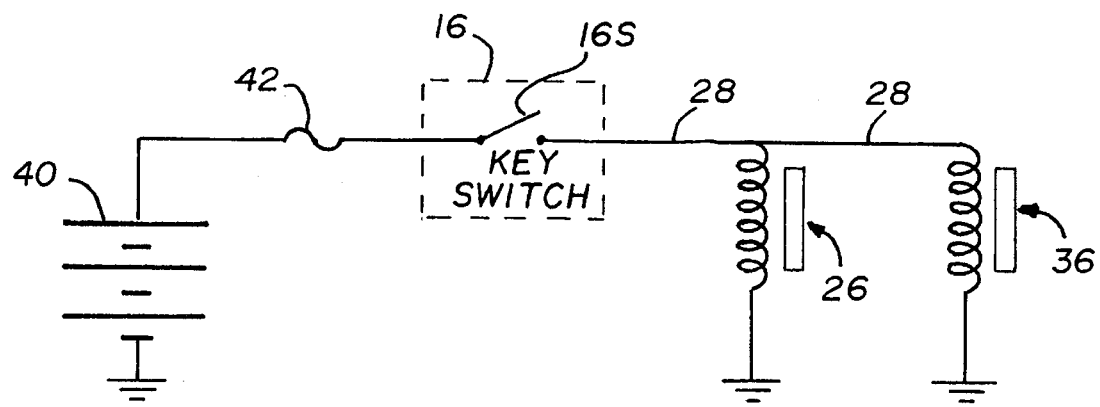
FIG. 2 is a circuit diagram of the system of FIG. 1.

This is better shown in FIG. 2 wherein the vehicle's source of electric power, e.g. conventional battery 40 or the vehicle's alternator or generator, when the vehicle is running couples electric voltage through a fuse 42 (or other current limiting device) to the key assembly 16 and to the switch 16S thereof. When the ignition key is inserted into the assembly 16 and turned to "start," "on," or "accessory," the switch 16S is closed and couples voltage through line 28 to the solenoids 26 and 36 whose other sides are grounded to the chassis of the vehicle 10. This completes a circuit and electric current flows through the coils of both of the solenoids 26 and 36 to energize them. (Current limiting resistors or other devices may also be employed in series with the solenoid coils, as is well known in the art of solenoid controls.)

The construction and operation of the solenoids 26 and 36 is essentially identical and can be explained by reference to FIGS. 3 and 4 wherein the solenoid 26 is depicted. As shown in FIG. 3, the solenoid 26 is de-energized, i.e., the key switch 16S is open. The solenoid 26 includes a coil 26C which surrounds a cylindrical space 26S. Mounted in this space is a mounted magnetic steel pin 26P which is spring biased by a spring 26S to be propelled out one end Of the spring 26SP. When the coil 26C is energized, the pin 26P is drawn down (compressing the spring 26SP) to the state illustrated in FIG. 4. The body of the steering wheel 18 is preferably made of hard plastic and is thus non-magnetic and rods 20 and 30 are preferably made of a non-magnetic material such as stainless steel, or carbon fiber rods so as to not interfere with the operation of the pin 26P and magnetic coil 26C.

The pin 26P serves to lock the rod 20 to the sleeve 22 by means of a hole 20H (sized to loosely receive the pin 26P) through the sleeve 22. The hole 20H is formed in the rod 20 such that it aligns the hole 20H with a pair of holes 22H and 22L formed in the sleeve 22 and sized to loosely receive the pin 26P when the rod 22 is at its extended position (FIG. 1) and the hole 30H is aligned with the holes 32H and 32L in the sleeve 30 and with the pin 36P.

As can be appreciated from FIG. 5 with respect to the rod 30, the pin 36P is spring-biased against the surface of the rod 30 with the key switch open and, when the rod 30 is manually moved (by the driver) outward, the pin will be driven into the hole 30H when the rod 30 reaches its extended position and the hole 30H is aligned with the holes 32H and 32L in the sleeve 30 and with the pin 36P.

To prevent removal of the rods 20 or 30 when the pin is held by the solenoid, a stop such as the stop 30S is provided at the end of the rods and the sleeves 22 and 31 are provided with partial slots such as the slot 32S (shown in FIGS. 3 and 5). When the rods are advanced outward, the stops contact the end of the slot 32S (such as the end 32SS shown in FIG. 5) and are held from being further advanced outward.

The retracted rods may be detented in their retracted position or, as shown, a more positive latching mechanism may be provided in the form of the partial sleeves 24 and 34 which are fitted around the outer surface of the wheel 18 and can slide from an upward position (sleeve 24 in FIG. 1 is in its uppermost position) to a lower position (sleeve 34 in FIG. 1 is in its lowermost position) where it restricts the rod from movement. FIG. 6 shows the transverse shape of the slide 34. The other slide 24 may be constructed as a mirror image of the slide 34.

Although a presently preferred embodiment of the invention has been described and depicted, the principles of the present invention at least in its broader aspects may be explored in a large range of alternatives. One or two rods may be used. The rods may be spring-loaded or motor driven so as to automatically extend upon turning off of the ignition switch 16S. A solid state device may be employed in lieu of a mechanical switch and, in lieu of solenoids, a mechanical coupling could be employed between the key assembly and the rods. The rods could be provided with a "one-way" locking mechanism that locks the rod at any desired extension over a range of extensions. Other alternative constructions may be employed without departing from the broad concepts of the present invention.

It should be appreciated that the present lock system has several advantages over prior art systems, including ease and quickness of operation and being difficult to defeat. For example, many vehicles are stolen by wrenching the key lock assembly to break the mechanical linkage to the steering wheel and then hotwiring the vehicle under the dash to bypass the key switch. However, since the present system employs a switch and wires that are not under the dash but toally contained in the steering wheel and steering column, hot-wiring the ignition under the dash would not close the key switch nor energize the solenoids 26 or 36. Thus, the conventional approach of car thieves would not defeat the present anti-theft system.

While particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

I claim:

1. A steering wheel anti-theft system for an automobile, the automobile having an ignition key switch assembly and a steering wheel, said system comprising in combination with the ignition key switch assembly and the steering wheel:

at least one extendable rod built into said steering wheel which rod is retractable to a stored position wherein it does not interfere with the operation of the vehicle and which rod is extendable to a position wherein it is visible and interferes with the driving of the automobile and means for locking said rod in an extended position, said locking means being intercoupled with the ignition key switch assembly such that said means automatically unlocks said rod when a key operates said ignition switch key assembly.

2. The system of claim 1 wherein said ignition key switch assembly includes an electrical switch and said locking means includes a solenoid operated by said electrical switch such that a locked extended rod is automatically unlocked by the operation of said solenoid when said key electrical switch is closed by the movement of a key inserted into said ignition key switch assembly.

3. The system of claim 1 wherein a second extendable rod is built into said steering wheel which second rod is retractable to a position wherein it does not interfere with the operation of the vehicle and which second rod is extendable to a position wherein it is visible and interferes with the driving of the automobile, and wherein:

means are provided for locking said second rod in an extended position, said second rod locking means being intercoupled with the ignition key switch assembly such that said second rod locking means automatically unlocks said second rod when a key operates said ignition switch key assembly.

4. The system of claim 3 wherein said ignition key switch assembly includes an electrical switch and each of said locking means includes a solenoid operated by said electrical switch such that a locked extended rod is automatically unlocked by, the operation of said solenoid when said key electrical switch is closed by the movement of a key inserted into said ignition key switch assembly.

5. The system of claim 2 wherein said rod, except when locked in its extended position, may be manually moved between its retracted stored position and its extended locked position.

6. The system of claim 4 wherein each of said rod and said second rod, except when locked in their extended position may be manually moved between their retracted positions and their extended locked positions.

7. The system of claim 5 wherein said rod extends generally radially from said steering wheel.

8. The system of claim 6 wherein each of said rods extends generally radially from said steering wheel.

9. In an automobile having a steering wheel column, source of electrical power, an ignition key assembly mounted to the steering wheel column, said key assembly including an electric switch which switch is opened and closed by turning of a key in the ignition key assembly for connection or not connecting said source of electrical power to an output, the improvement comprising:

a steering wheel having a transverse member that is movable between a position wherein said member extends radially outward from the steering wheel and obstructs normal use of the steering wheel;

an electronically operated latch for securing said member in an outward extended position; and means coupling said output of said electric switch to said latch whereby said latch may secure said member in the extended position when said electric switch is opened or allow it to be retracted when said electric switch is closed.

* * * * *